(12) United States Patent
Matsuzaki et al.

(10) Patent No.: US 8,502,475 B2
(45) Date of Patent: *Aug. 6, 2013

(54) DISCHARGE LAMP BALLAST WITH FEEDBACK CURRENT CONTROL DURING AN ELECTRODE HEATING OPERATION

(75) Inventors: Nobutoshi Matsuzaki, Neyagawa (JP); Jun Kumagai, Suita (JP); Satoru Nagata, Kobe (JP)

(73) Assignee: Panasonic Corporation, Osaka (JP)

( * ) Notice: Subject to any disclaimer, the term of this patent is extended or adjusted under 35 U.S.C. 154(b) by 470 days.

This patent is subject to a terminal disclaimer.

(21) Appl. No.: 12/711,756

(22) Filed: Feb. 24, 2010

(65) Prior Publication Data
US 2010/0237794 A1   Sep. 23, 2010

(30) Foreign Application Priority Data

Feb. 24, 2009 (JP) ................................. 2009-041489

(51) Int. Cl.
*H05B 37/02* (2006.01)
(52) U.S. Cl.
USPC .................... 315/308; 315/209 CD; 315/224; 315/225; 315/226
(58) Field of Classification Search
USPC ......... 315/209 R, 307, 308, 291, 224, 209 M, 315/209 CD, 225, 226
See application file for complete search history.

(56) References Cited

U.S. PATENT DOCUMENTS

| 6,160,362 | A  | * | 12/2000 | Shone et al. | 315/308 |
| 6,518,712 | B2 | * | 2/2003 | Weng | 315/209 R |
| 6,965,204 | B2 |   | 11/2005 | Langeslag | |
| 7,161,308 | B2 | * | 1/2007 | Kanno et al. | 315/291 |
| 7,944,156 | B2 | * | 5/2011 | Quazi | 315/307 |
| 8,093,837 | B2 | * | 1/2012 | Goriki et al. | 315/307 |
| 2004/0257000 | A1 |   | 12/2004 | Langeslag | |
| 2006/0039168 | A1 | * | 2/2006 | Mier-Langner et al. | 362/648 |
| 2007/0138975 | A1 |   | 6/2007 | Suganuma et al. | 315/291 |
| 2007/0210723 | A1 | * | 9/2007 | Kumagai et al. | 315/209 M |
| 2007/0228996 | A1 |   | 10/2007 | Sugaya | |
| 2007/0285032 | A1 | * | 12/2007 | Fukuda et al. | 315/307 |

FOREIGN PATENT DOCUMENTS

| JP | 2005507553 | 3/2005 |
| JP | 2006127793 | 5/2006 |
| JP | 2007273235 | 10/2007 |
| JP | 2008192316 | 8/2008 |

OTHER PUBLICATIONS

Japanese Examination Report issued on Mar. 5, 2013.

* cited by examiner

*Primary Examiner* — Thuy Vinh Tran
(74) *Attorney, Agent, or Firm* — Waddey & Patterson, P.C.; Mark J. Patterson; Gary L. Montle

(57) ABSTRACT

A discharge lamp ballast is provided with a feedback control operation to provide optimal lamp current flow during an electrode heating operation. A startup circuit coupled together with a discharge lamp between output terminals of a DC-AC power converter having a plurality of switches. The startup circuit generates a high voltage to ignite the lamp. A lamp current sensor detects an amplitude of an output current to the lamp. A control circuit controls the switches in accordance with each of a plurality of control operations including a startup operation to ignite the lamp using the high voltage generated by the startup circuit, an electrode heating operation wherein an operating frequency of the switches is controlled to set the amplitude of the detected output current to a predetermined target current amplitude, and a normal operation wherein the operating frequency is reduced to maintain stable lighting of the lamp.

20 Claims, 9 Drawing Sheets

DISCHARGE LAMP BALLAST WITH FEEDBACK CURRENT CONTROL DURING AN ELECTRODE HEATING OPERATION

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: Japan Patent Application No. 2009-041489, filed Feb. 24, 2009.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to discharge lamp ballasts and illumination fixtures containing discharge lamps powered by the ballasts. More particularly, the present invention relates to a discharge lamp ballast with feedback control during an electrode heating operation for providing optimal current flow through a discharge lamp.

Discharge lamp ballasts such as that shown for example in FIG. 9 are well known in the art for powering hot cathode type discharge lamps such as a high-pressure discharge lamp (or a high-intensity discharge lamp, also known as HID lamps). These ballasts generally include a DC-AC power converter and a control circuit for controlling the power converter.

The particular discharge lamp ballast 1 of FIG. 9 includes a direct-current (DC) power source E for converting alternating-current (AC) power, for example supplied from an AC power source AC such as a commercial power source, into DC power.

The DC power source E includes a diode bridge DB that full-wave rectifies an AC power input from the AC power source, a diode D0 having an anode coupled to a high-side output terminal of the diode bridge DB via an inductor L0 and a cathode coupled to ground via an output capacitor C0, a switching element Q0 with a first end coupled to a node between the inductor L0 and the diode D0 and a second end coupled to ground, and a driver circuit (not shown) for controlling the switching element Q0 to turn on/off and thereby maintaining a constant output voltage of the DC power source E (i.e., a voltage across the output capacitor C0). Specifically, the DC power source E is configured by coupling a commonly-known boost converter (i.e., a step-up chopper circuit) across output terminals of the diode bridge DB.

The conventional discharge lamp ballast 1 as shown in FIG. 9 further includes a power converter with four switching elements Q1 to Q4 arranged in a full bridge circuit configuration for converting a DC power input from the DC power source E into AC power. Field effect transistors (FETs or MOSFETS) can be used as the switching elements Q1 to Q4. A node between switching elements Q1 and Q2 is a first output terminal of the full bridge circuit and coupled to one end of a discharge lamp La (that is, one of the lamp electrodes) via a secondary winding of an auto-transformer AT. A tap in the auto transformer is further connected to ground via a first capacitor C1. A node between switching elements Q3 and Q4 is a second output terminal of the full bridge circuit and is coupled to the other electrode of the discharge lamp La via the inductor L1. A second capacitor C2 is further coupled on a first end between the switching elements Q1 and Q2 and on a second end between the inductor L1 and discharge lamp La. The auto-transformer At, the first capacitor C1, the second capacitor C2, and the inductor L1 collectively make up a resonant circuit coupled between the output terminals of the power converter (hereinafter referred to as "a load circuit") together with the discharge lamp La.

The discharge lamp ballast 1 further includes a control circuit 2 for driving each of the switching elements Q1 to Q4. The control circuit 2 drives the switching elements Q1 to Q4 to be on or off so that a diagonally-positioned pair among the switching elements Q1 to Q4 (i.e., Q1 and Q4 or Q2 and Q3) can be turned on at the same time and a pair coupled with each other in series among the switching elements Q1 to Q4 (i.e., Q1 and Q2 or Q3 and Q4) can be alternately turned on or off. In this manner, DC power input from the DC power source E is converted into AC power, and a polarity reversal frequency of the AC power becomes a polarity reversal frequency generated by the above-mentioned on-off driving of the switching elements (hereinafter referred to as "an operating frequency").

The control circuit 2 in a conventional example as shown in FIG. 9 carries out three control operations. First, a startup operation is conducted to ignite the discharge lamp La by relatively increasing an output voltage from the power converter. An electrode heating operation is conducted for relatively increasing a frequency of output power of the power converter to heat each electrode or filament of the discharge lamp La. Finally, a normal operation follows wherein an AC power is provided from the power converter for maintaining stable light output of the discharge lamp La.

Referring to FIG. 10, an example of operations by the control circuit 2 may be explained further. The first four waveforms of FIG. 10 show drive input signals to the respective switching elements Q1 to Q4, or more particularly, voltages applied between the gate and the source of each switching element. The respective switching elements Q1 to Q4 are turned on in periods when the drive signals are in an H level and turned off in periods when the drive signals are in an L level. Horizontal axes of the respective graphs of FIG. 10 represent time. When a power source is turned on, the control circuit 2 enters a startup operation to initiate discharge in the discharge lamp La. During a startup period P1 when the startup operation is carried out, the control circuit 2 sufficiently raises a voltage output Vla to the discharge lamp La (hereinafter referred to as "a lamp voltage") to initiate discharge in the discharge lamp La by setting the operational frequency to approximately a resonant frequency of the load circuit consistent with a state where the discharge lamp La is extinguished (hereinafter referred to as "a low-load resonant frequency"), for example a few dozen kHz to a few hundreds kHz. The low-load resonant frequency is a resonant frequency (or 1/n multiplied by the resonant frequency where "n" is a whole number) of a resonant circuit made up of a primary winding of the auto-transformer AT (the portion coupled between the tap and the node between switching elements Q1 and Q2) and the first capacitor C1. When the lamp voltage Vla obtained by stepping up the resonant voltage generated in the startup period P1 with the auto-transformer AT is increased to a voltage required for ignition (i.e., the start of glow discharge), the discharge lamp La ignites and an output current starts to flow through the discharge lamp La. Specifically, the auto-transformer AT and the first capacitor C1 define a startup circuit.

After the startup period P1, the control circuit 2 shifts to an electrode heating period P2 wherein the electrode heating operation is carried out. In the example of FIG. 10, the operational frequency is maintained in the electrode heating period P2 at the same frequency as the operational frequency in the startup period P1.

After the electrode heating operation is completed, for example after a predetermined time, the control circuit 2 shifts to a normal period P3 when normal lamp operation is carried out. As the temperature in the discharge lamp La rises, the lamp voltage V gradually increases for a few minutes immediately after the shift to the normal period P3 and then stabilizes. The operational frequency f in the normal operation is, for example, a few dozen Hz to a few hundreds Hz. In the example of FIG. 10, the control circuit 2 in the normal period P3 controls output power to the discharge lamp La with a PWM control signal to turn on or off switching elements Q3 and Q4 at a duty ratio depending on a desired output power to the discharge lamp La and at a sufficiently higher frequency than the operational frequency fat which the switching elements Q1 and Q2 are turned on and off.

In the example of FIG. 10, because the same operating frequency is employed in the startup period P1 and in the electrode heating period P2, the amplitude of the lamp current Ila is lower than an amplitude $I_r$ required to sufficiently heat an electrode of the discharge lamp La.

Referring now to FIG. 11, it has been proposed to decrease the operating frequency f when transitioning from the startup period P1 to the electrode heating period P2. Because the operating frequency f is in a range where amplitude |Ila| of the lamp current Ila decreases in a curved relationship with respect to increases in the operating frequency f as shown in FIG. 12, the control circuit 2 decreases the lamp voltage Vla to correspondingly increase the lamp current Ila in the electrode heating period P2 by adjusting the operating frequency f lower than the operating frequency f upon termination of the startup period P1. In this manner, the lamp current Ila in the electrode heating period P2 can be sufficiently increased, and the discharge in the discharge lamp La can be shifted from the glow discharge to the arc discharge and stabilized. In addition, each of the electrodes of the discharge lamp La is heated, and an asymmetry current condition caused by a temperature difference between the electrodes of the discharge lamp La is also decreased or eliminated after the electrode heating period P2.

As additionally shown in the example of FIG. 11, the control circuit 2 gradually increases the lamp voltage Vla during a first portion of the startup period P1 by gradually reducing the operating frequency f to approach a low-load resonant frequency.

Moreover, in the example of FIG. 11 the operating frequency f is further decreased from a first portion to a second portion of the electrode heating period P2. Both of the two operating frequency f values in the two displayed portions of the electrode heating period P2 are predetermined values.

According to a conventionally known discharge lamp ballast as described above, the discharge in the discharge lamp La is shifted from glow discharge to arc discharge in an electrode heating operation, thereby stabilizing the discharge after transition to a normal operation in comparison to a case where the electrode heating operation is not carried out, and preventing the lamp from being suddenly and undesirably extinguished.

The impedance of the load circuit varies due to characteristics of circuit components and of the discharge lamp La and further due to an ambient temperature. Accordingly, when an operating frequency f value for the electrode heating operation is predetermined, the lamp current may be insufficient in the electrode heating operation, and accordingly the light output from the discharge lamp La in the subsequent normal operation is not stabilized. Conversely, an excessive lamp current may be provided during the electrode heating operation and electric stresses may therefore be applied to the circuit components and the discharge lamp La.

BRIEF SUMMARY OF THE INVENTION

The present invention considers the above-mentioned problems, and a purpose of the present invention is to provide a discharge lamp ballast and an illumination fixture with feedback control during an electrode heating operation to optimize an output current to the discharge lamp.

In a first aspect of the present invention, a discharge lamp ballast is provided with a feedback control operation to provide optimal lamp current flow during an electrode heating operation. A startup circuit is coupled together with a discharge lamp between output terminals of a DC-AC power converter having a plurality of switches. The startup circuit generates a high voltage to ignite the lamp. A lamp current sensor detects an amplitude of an output current to the lamp. A control circuit controls the switches in accordance with each of a plurality of control operations including a startup operation to ignite the lamp using the high voltage generated by the startup circuit, an electrode heating operation wherein an operating frequency of the switches is controlled to set the amplitude of the detected output current to a predetermined target current amplitude, and a normal operation wherein the operating frequency is reduced to maintain stable lighting of the lamp.

In a second aspect of the present invention, a method is provided for feedback current control in a discharge lamp ballast during an operation to heat electrodes in a discharge lamp. The ballast includes a DC-AC power converter having a plurality of switching elements, a lamp current sensor and a control circuit. A first step of the method includes repeatedly controlling an operating frequency for the switching elements to sweep from an upper limit to a lower limit through a predetermined range of frequencies in a startup operation to ignite the discharge lamp. A second step of the method includes, upon completion of the startup operation, decreasing the operating frequency to a predetermined frequency during an intermediate operation. A third step includes upon completion of the intermediate operation, adjusting the operating frequency during the electrode heating operation based on a predetermined target current amplitude and a detected lamp current amplitude from the lamp current sensor. A fourth step of the method includes upon completion of the electrode heating operation, decreasing the operating current during a normal operation to maintain stable light output from the lamp.

In another aspect of the present invention, an illumination fixture is provided with a discharge lamp ballast having a feedback electrode heating current control. A ballast housing is configured to house the discharge lamp ballast. A lamp housing is configured to house a discharge lamp, with the lamp housing mechanically coupled to the ballast housing and the discharge lamp ballast electrically coupled to the discharge lamp. The lamp ballast further includes a DC-AC power converter having a plurality of switching elements, a startup circuit effective to generate a high voltage and ignite the discharge lamp, a lamp current sensor, and a control circuit. The control circuit controls the switching elements of the power converter in accordance with each of a plurality of control operations. A startup operation ignites the discharge lamp using the high voltage generated by the startup circuit. An electrode heating operation follows after the startup operation wherein an operating frequency of the switching elements is controlled in a feedback manner so as to set the amplitude of the current detected by the lamp current sensor to a predetermined target current amplitude. One or more frequency decreasing operations occur during an intermediate period between termination of the startup operation and initiation of the electrode heating operation, with each frequency decreasing operation in the intermediate period including stepping the previous frequency to a predetermined frequency.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

The term "signal" means at least one current, voltage, charge, temperature, data or other signal.

The terms "switching element" and "switch" may be used interchangeably and may refer herein to at least: a variety of transistors as known in the art (including but not limited to FET, BJT, IGBT, IGFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" as used herein generally refer to an inverter circuit for DC-AC power conversion, but is not so inherently limited, and with respect to any particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

The terms "electrode heating" and "filament heating" may refer herein to equivalent operations by the discharge lamp ballast, and may differ only with respect to the type of discharge lamp upon which the heating operation is performed, unless otherwise stated herein.

Referring to FIGS. 1-8, various embodiments of a discharge lamp ballast and methods for operating the same in accordance with the present invention may be described herein.

Figure 1:
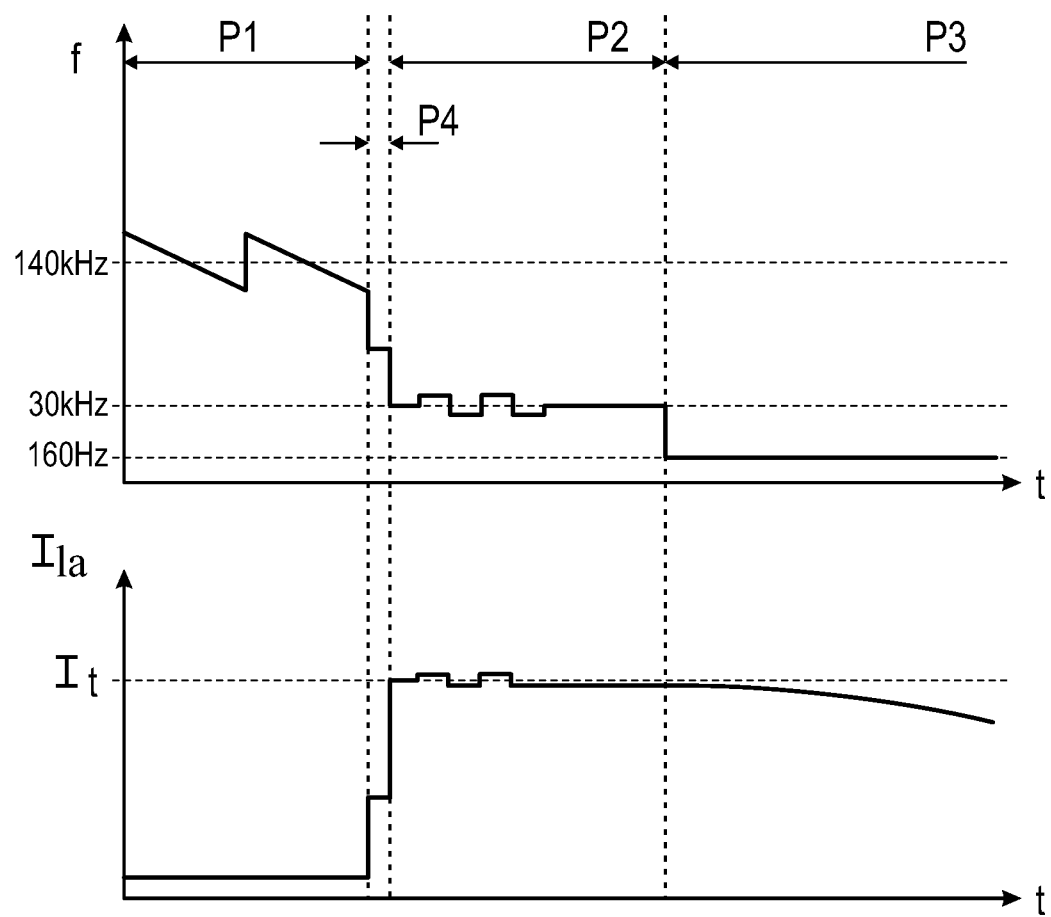
FIG. 1 is a graphical diagram showing an example of temporal changes in an operating frequency and a current amplitude in an embodiment of the present invention.
Figure 2:
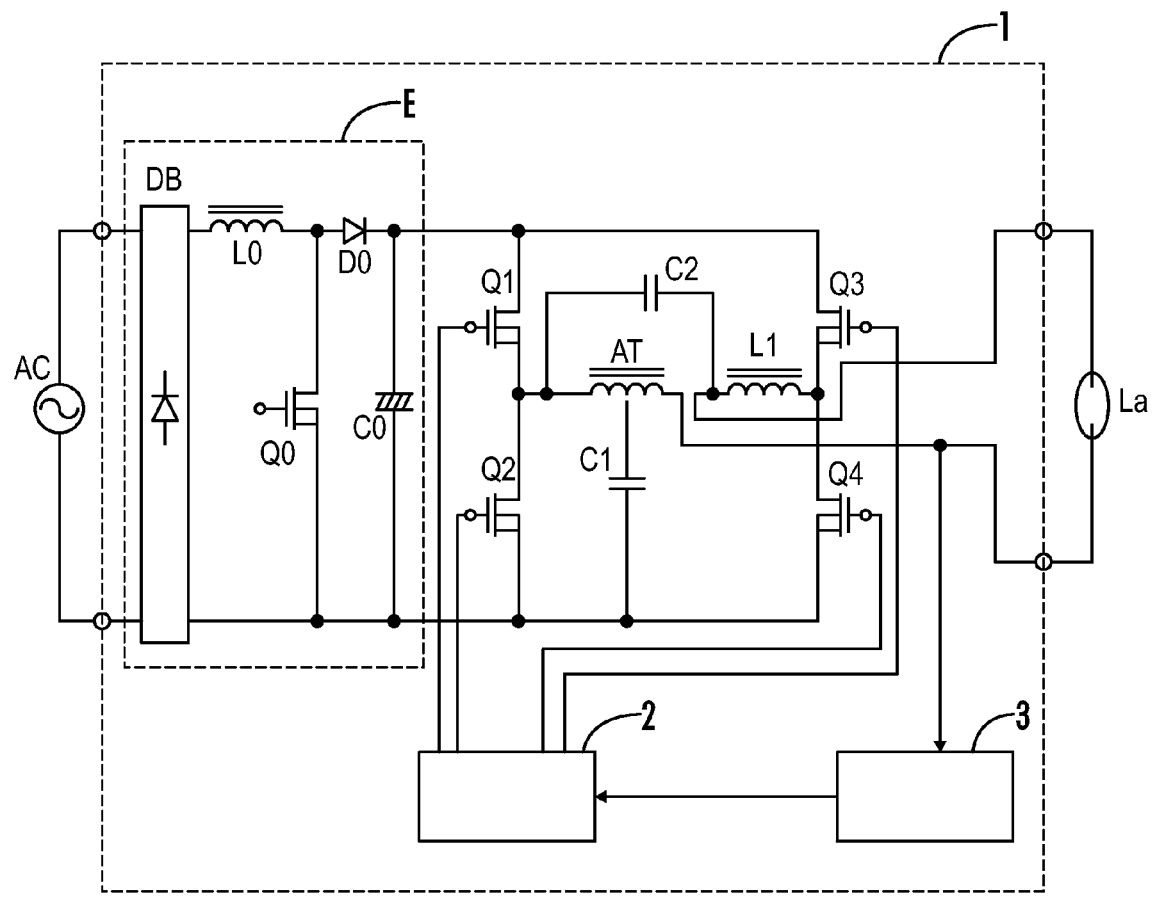
FIG. 2 is a circuit and block diagram showing a lamp ballast in the embodiment of FIG. 1.
Figure 9:
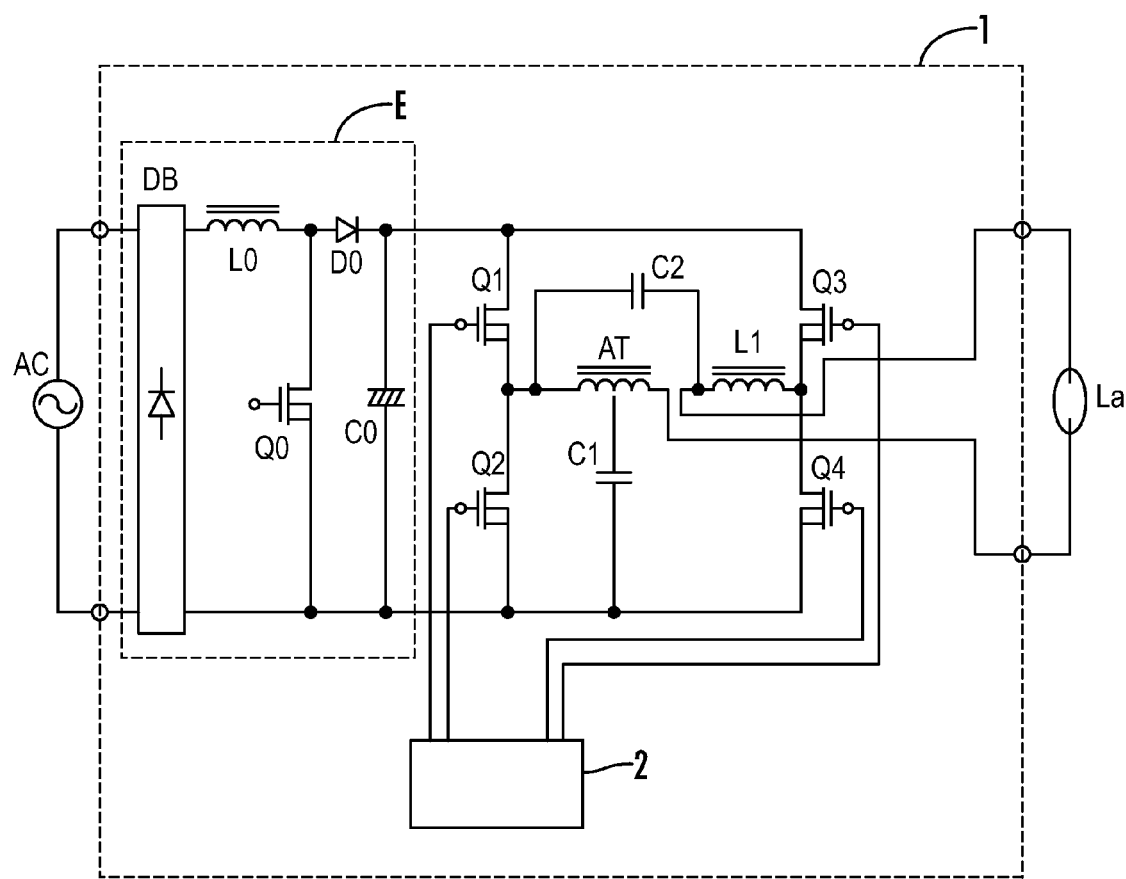
FIG. 9 is a circuit block diagram showing a discharge lamp ballast as previously known in the art.
Figure 10:
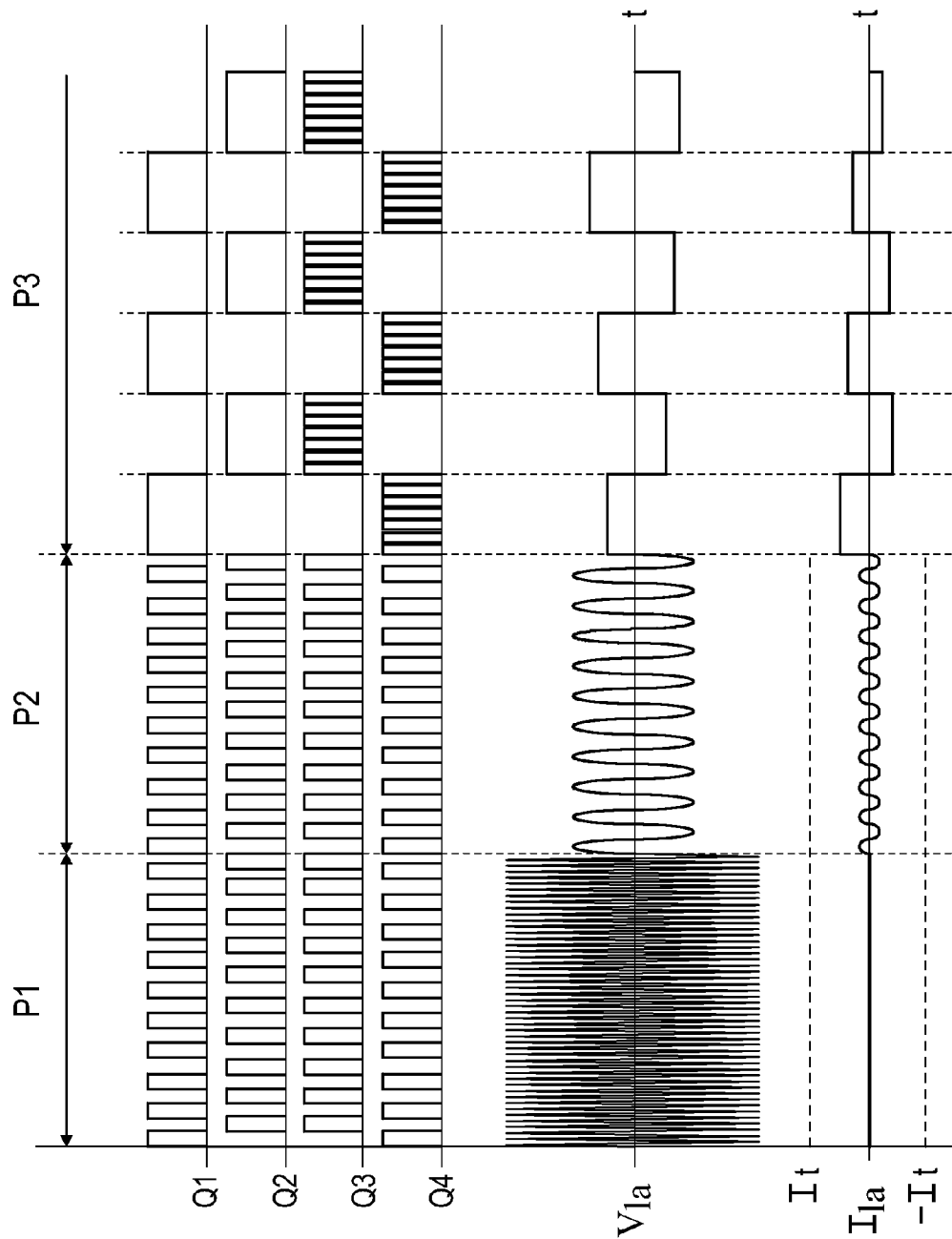
FIG. 10 is a graphical diagram showing an example of temporal changes to drive signal inputs, a lamp voltage, and a lamp current in the ballast of FIG. 9.
Figure 11:
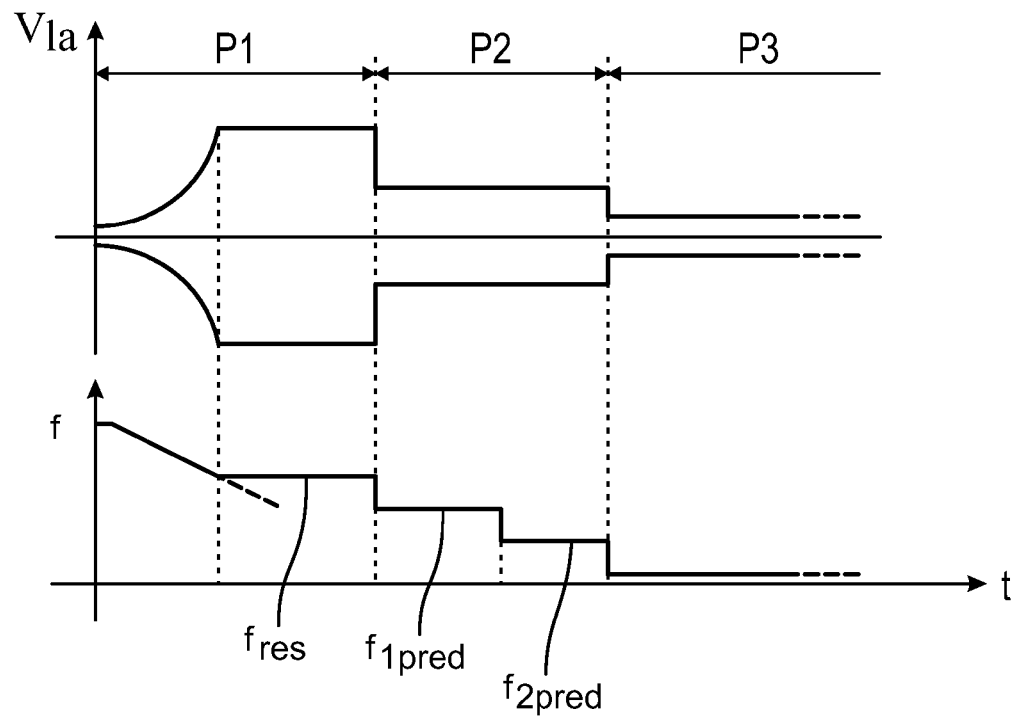
FIG. 11 is a graphical diagram showing an example of temporal changes to a lamp voltage and an operating frequency in the ballast of FIG. 9.

An embodiment of the discharge lamp ballast and operation thereof may be described first with reference to FIGS. 1-2 generally. Because a basic configuration of this embodiment is substantially the same as that of a discharge lamp ballast as shown in FIG. 9 and FIG. 10, further illustrations and explanations of the same portions may be omitted as redundant.

As shown in FIG. 1, the control circuit 2 in an embodiment of the present invention repeats an operation during the startup period P1 to continuously adjust (i.e., "sweep") an operating frequency f from an upper limit to a lower limit through a range that includes 140 kHz, which in the example shown is approximately one-third of 430 kHz as the low-load resonant frequency. The control circuit 2 may be programmed to terminate the startup operation upon a predetermined condition, for example when initiation of discharge in the discharge lamp La is detected by a commonly-known technique, or for example where a predetermined amount of time sufficient to start the discharge lamp La has passed after the beginning of the startup operation.

Figure 12:
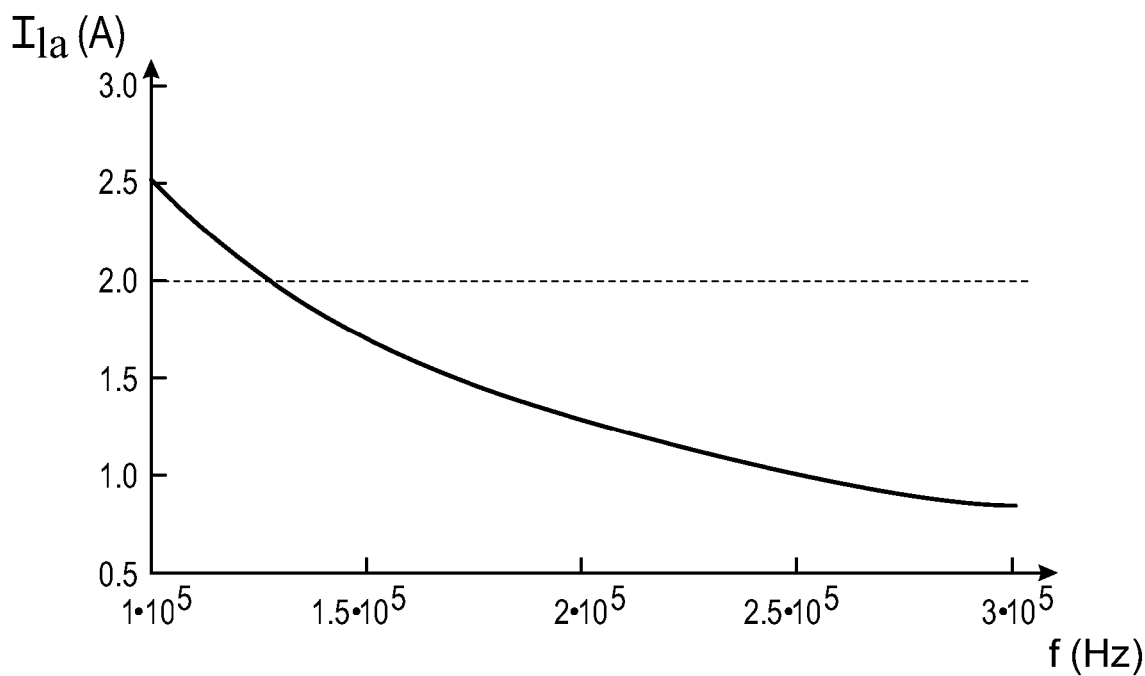
FIG. 12 is a graphical diagram showing an example of a relationship between the amplitude and operating frequency of the lamp current provided by the ballast of FIG. 9.

Moreover, as shown in FIG. 2, the present embodiment includes a lamp current sensor 3 for detecting an amplitude |Ila| of the lamp current Ila (hereinafter referred to as "a current amplitude"), and the control circuit 2 controls the operating frequency f in a feedback manner during the electrode heating period P2 so as to drive the current amplitude |Ila| to a predetermined target current amplitude $I_t$. For example, in a case as shown in FIG. 12 where the operating frequency f is adjusted in a range where the current amplitude |Ila| gradually decreases with respect to the operating frequency f, when the current amplitude |IIa| detected by the lamp current sensor 3 is less than the target current amplitude $I_t$, the operating frequency f is decreased to increase the current amplitude |IIa|, and when the current amplitude |IIa| detected by the lamp current sensor 3 is larger than the target current amplitude $I_t$, the operating frequency f is increased to decrease the current amplitude |IIa|.

Adjustments to the operating frequency f in the above-mentioned feedback control operation may in various embodiments be either stepped or continuous.

In addition, the current amplitude |IIa| detected by the lamp current sensor 3 may in various embodiments be compared to the target current amplitude $I_t$ periodically (intermittently) or full-time (continuously). In both cases, the above-mentioned control circuit 2 and lamp current sensor 3 can be configured in accordance with commonly-known techniques, and accordingly detailed drawings and explanations will be omitted.

Referring again to the example of FIG. 1, as the result of the above-mentioned control the operating frequency f in the electrode heating period P2 is lower than 140 kHz, (i.e., lower than the operating frequency f in the start-up period P1), and is approximately 30 kHz higher than the operating frequency f (160 Hz) in the normal period P3.

Figure 3:
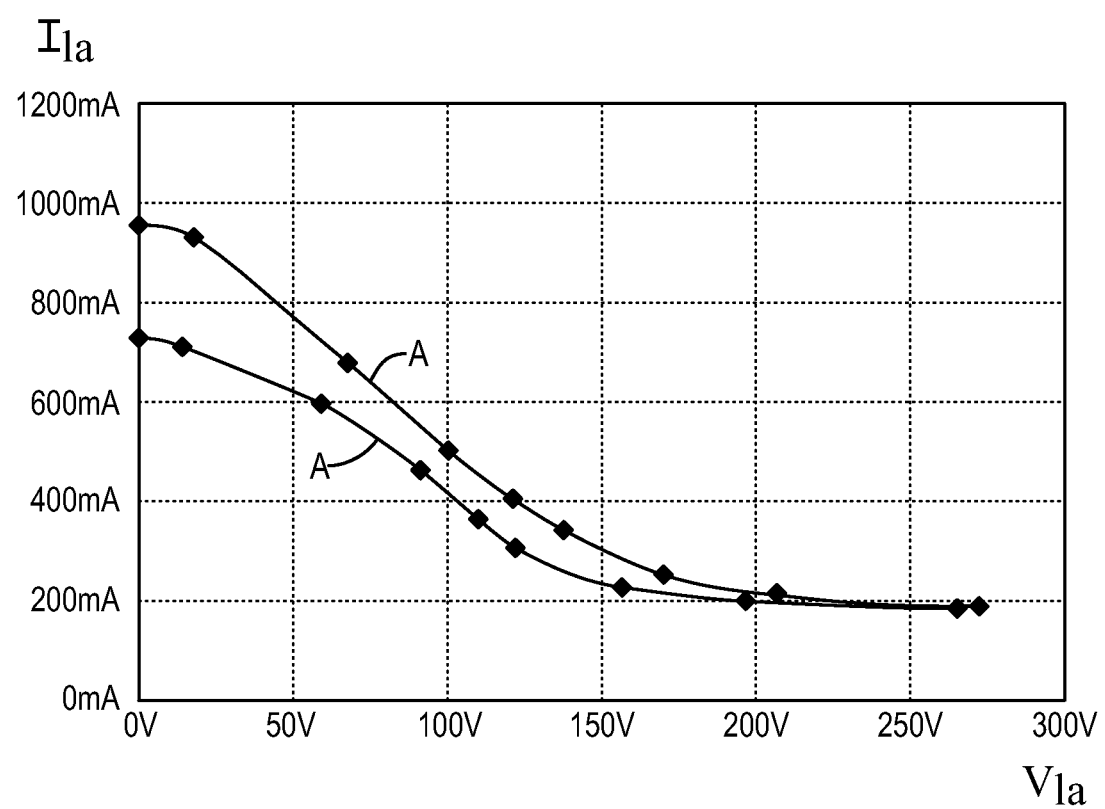
FIG. 3 is a graphical diagram showing a relationship between lamp current amplitude and lamp voltage amplitude in the embodiment of FIG. 1.

An example of control operation may be further described with reference to FIG. 3. For example, when the operating frequency f is 39 kHz, the relationship between the amplitude of the lamp voltage Via (hereinafter referred to as "a voltage amplitude") |Vla| and the current amplitude |IIa| is shown by the curved line A. When the operating frequency f is 41 kHz, the relationship between the voltage amplitude |Vla| and the current amplitude |IIa| is shown by a curved line B. A target current amplitude is 200 mA in this example. If the operating frequency f is 39 kHz (curved line A) at a voltage amplitude |Vla| of 150V, the current amplitude |IIa| is approximately 300 mA. In this case, the control circuit 2 decreases the current amplitude |IIa| to shift the current amplitude |IIa| closer to the target current amplitude by increasing the operating frequency f, for example by 2 kHz to a frequency as indicated by curved line B.

In various embodiments, the current amplitude |IIa| in the electrode heating period P2 can be adequately maintained by controlling the operating frequency f to set the current amplitude |IIa| detected in the above-mentioned manner to the target current amplitude.

Additionally, in an embodiment the control circuit 2 may be programmed not to start the electrode heating operation immediately after termination of the startup operation, but instead to perform first and second frequency decreasing operations. The control circuit 2 may decrease the operating frequency f to a predetermined frequency both at the beginning of an intermediate period P4 after the termination of the startup period P1 and upon termination of the intermediate period P4 before the beginning of the electrode heating period P2.

In the example shown in FIG. 1, the operating frequency f is decreased in a stepped manner to an intermediate frequency between 140 kHz and 30 kHz in the first frequency decreasing operation, and the operating frequency f is further decreased in a stepped manner to 30 kHz in the second frequency decreasing operation. However, in various embodiments of the intermediate period P4, the operating frequency f may be continuously and gradually decreased from 140 kHz to 30 kHz in a single frequency decreasing operation, or the operating frequency f may be decreased in the stepped manner through three or more frequency decreasing operations, or some combination of both operations.

In an embodiment as shown in FIG. 1, the intermediate period P4 is shorter in duration than the electrode heating period P2 (that is, a continuous time of the electrode heating operation). In this manner, because a necessary time period for stabilizing the current amplitude |IIa| becomes relatively long because of the feedback control in comparison with a case where the intermediate period P4 is longer than the electrode heating period P2, the startup performance of the discharge lamp ballast can be improved.

The decrease in operating frequency f during the intermediate period P4 is larger than a maximum value of the decrease in the operating frequency f provided in the electrode heating period P2 during an equivalent length of time as that of the intermediate period P4. Because the time until the current amplitude |IIa| approaches the target current amplitude $I_t$ after termination of the startup operation is therefore shorter compared to a case where the frequency decreasing operation (i.e., the intermediate period P4) is not carried out, the startup performance for the discharge lamp ballast can be improved.

Figure 4:
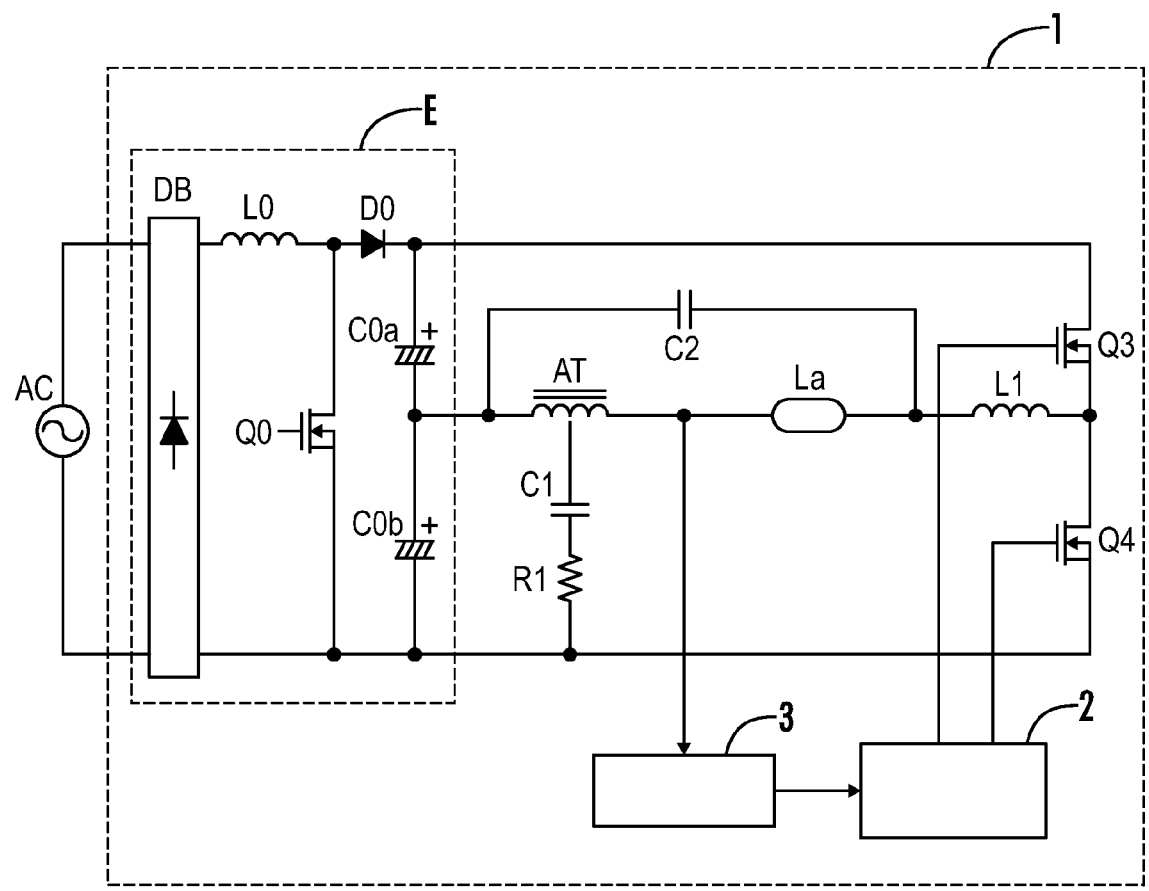
FIG. 4 is a circuit and block diagram showing another embodiment of a lamp ballast of the present invention.

Referring now to FIG. 4, in various embodiments the full bridge circuit shown in FIG. 2 may be replaced with a half bridge circuit employing capacitors C0a and C0b instead of the switching elements Q1 and Q2, respectively. The above-mentioned series circuit of capacitors C0a and C0b may also serve as an output capacitor C0 of the step-up chopper circuit of the DC power source E. A resistor R1 is added between a first capacitor C1 and the ground terminal. In an embodiment a PWM control operation for adjusting output power to the discharge lamp La is executed during the normal period P3 on the basis of an on-off duty ratio of the switching elements Q3 and Q4.

Figure 5:
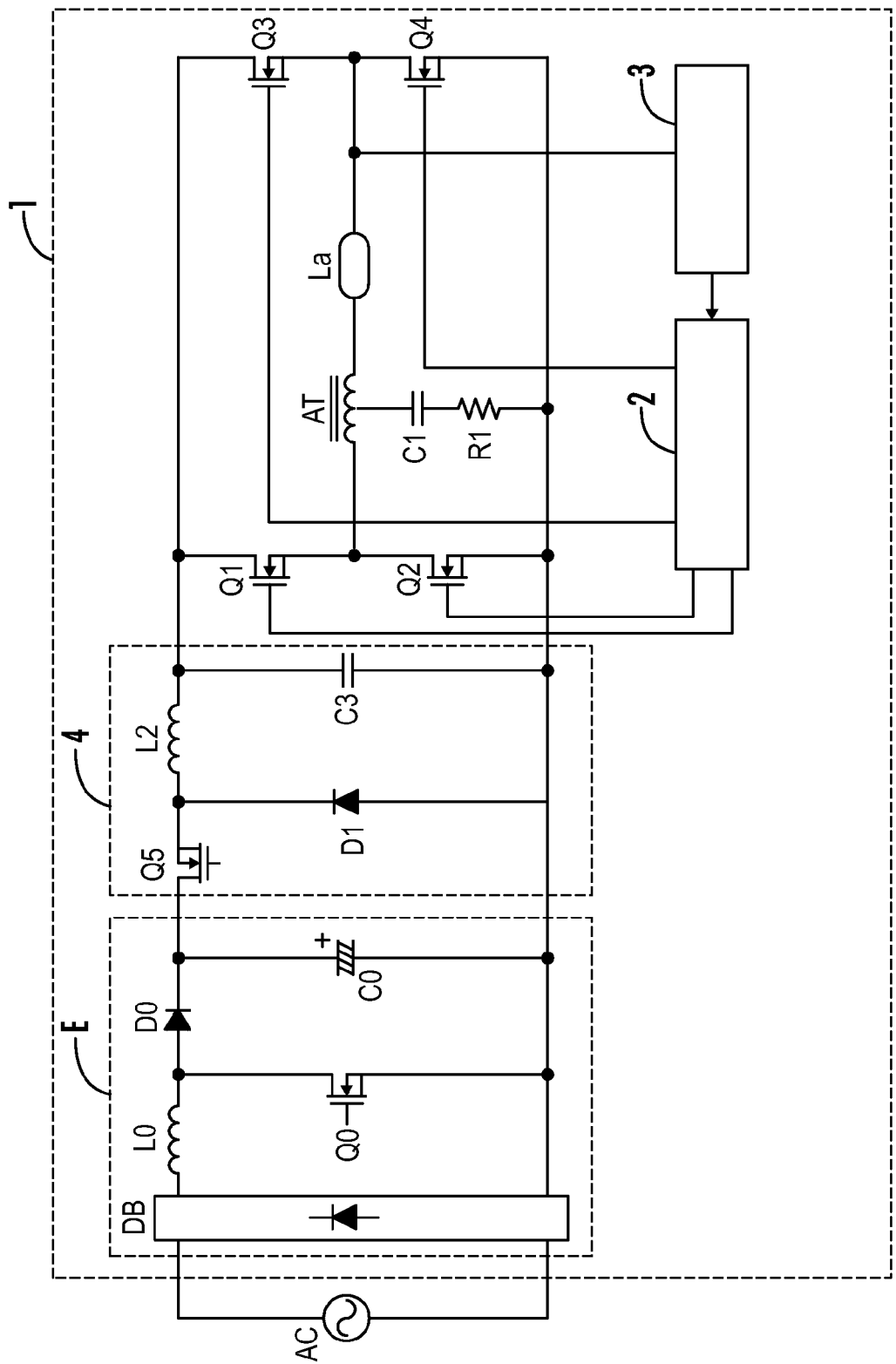
FIG. 5 is a circuit and block diagram showing another embodiment of a lamp ballast of the present invention.

In an embodiment as shown in FIG. 5, a step-down chopper circuit 4 (i.e., buck chopper) may be included for stepping down the output voltage of the DC power source E and providing the voltage to the full bridge circuit with switching elements Q1 to Q4. The step-down chopper circuit 4 may include a switching element Q5 coupled between a positive output terminal of the DC power source E and an input terminal of the full bridge circuit via an inductor L2, a diode D1 whose cathode is coupled to a node between the switching element Q5 and the inductor L2 and whose anode is coupled to ground, and a capacitor C3 coupled in parallel with input terminals of the full bridge circuit (i.e., across the output terminals of the step-down chopper circuit 4).

In the example of FIG. 5, and in contrast with the embodiment shown in FIG. 2, the inductor L1 and the second capacitor C2 may be omitted from the load circuit. Because the control circuit 2 can control power supplied to the discharge lamp La on the basis of an on-off duty ratio for the switching element Q5 of the step-down chopper circuit 4, the above-mentioned PWM control operation based on the on-off duty ratios for the switching elements Q1 to Q4 of the full bridge circuit is unnecessary even in the normal period P3.

The above-mentioned control circuit 2 and current sensor 3 are both able in various embodiments to be realized by commonly-known electronic circuitry, and detailed drawings and further explanations may be omitted as unnecessary.

Figure 6:
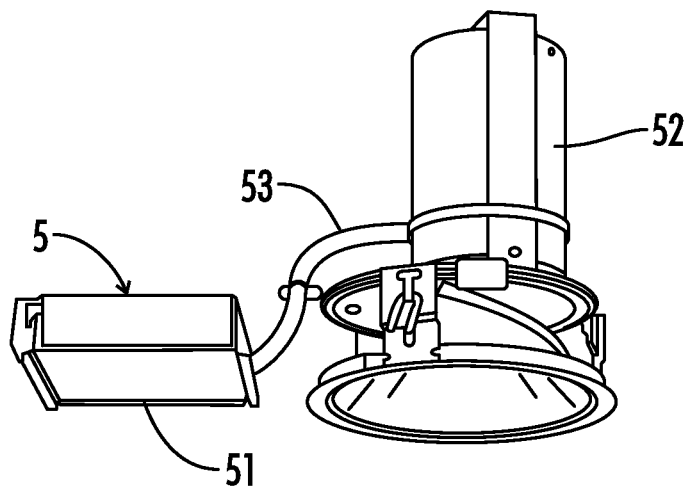
FIG. 6 is a perspective view showing an example of an illumination fixture using one of various embodiments of a lamp ballast in accordance with the present invention.
Figure 7:
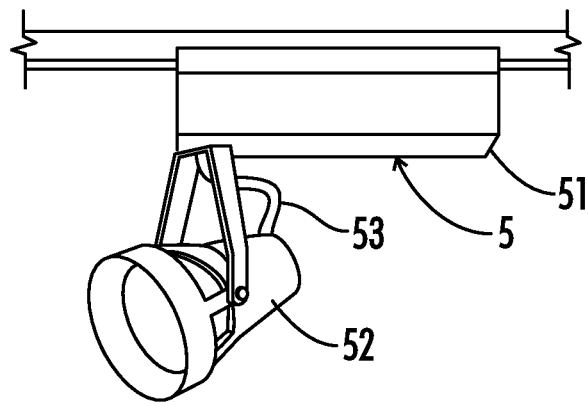
FIG. 7 is a perspective view showing another example of an illumination fixture using one of various embodiments of a lamp ballast in accordance with the present invention.
Figure 8:
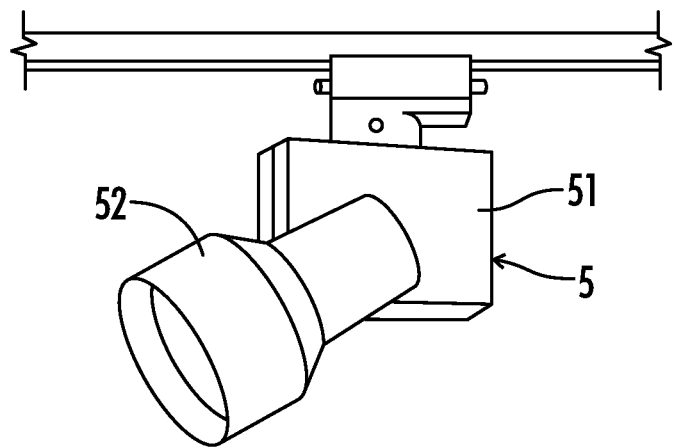
FIG. 8 is a perspective view showing another example of an illumination fixture using one of various embodiments of a lamp ballast in accordance with the present invention.

Referring now to FIGS. 6-8, an illumination fixtures 5 may be provided in accordance with the present invention including various embodiments of the discharge lamp ballast 1 as described herein. The illumination fixtures 5 shown in FIGS. 6 to 8 include a ballast housing 51 for the discharge lamp ballast 1 and a lamp housing 52 for the discharge lamp La. In addition, the illumination fixture 5 of FIG. 6 and the illumination fixture 5 of FIG. 7 include a power supply line 53 electrically coupling the discharge lamp ballast 1 to the discharge lamp La, respectively. The illumination fixture 5 of FIG. 6 is a downlight whose ballast housing 51 and lamp housing 52 are both fixed to a ceiling surface, and the illumination fixture 5 of FIG. 7 and the illumination fixture 5 of FIG. 8 are spotlights whose lamp housing 52 is pivotally attached so as to allow oscillation with respect to the ballast housing 51 fixed to an attachment surface such as the ceiling surface. The above-mentioned types of illumination fixtures 5, more particularly the ballast housing and lamp housing, can be realized by various commonly-known techniques, and detailed explanations may therefore be omitted.

Thus, although there have been described particular embodiments of the present invention of a new and useful Discharge Lamp Ballast with Feedback Current Control during an Electrode Heating Operation, it is not intended that such references be construed as limitations upon the scope of this invention except as set forth in the following claims.

What is claimed is:

1. A discharge lamp ballast comprising:
   a DC-AC power converter having a plurality of switching elements;
   a startup circuit coupled between output terminals of the power converter, the startup circuit configured to generate a high voltage to ignite a discharge lamp;
   a lamp current sensor functional to detect an amplitude of a lamp output current; and
   a control circuit effective to control the switching elements of the power converter in accordance with each of a plurality of control operations, the control operations comprising
      a startup operation to ignite a discharge lamp using the high voltage generated by the startup circuit,
      an electrode heating operation after the startup operation during which the amplitude of the lamp output current detected by the lamp current sensor is compared by the control circuit to a predetermined target current amplitude, further wherein an operating frequency of the switching elements is controlled in a feedback manner during the electrode heating operation so as to set the amplitude of the lamp output current detected by the lamp current sensor to the predetermined target current amplitude, and
      a normal operation after the electrode heating operation wherein the operating frequency is reduced to maintain stable lamp lighting.

2. The discharge lamp ballast of claim 1, wherein the control circuit increases the operating frequency of the switching elements of the power converter in response to a detected current amplitude greater than the predetermined target current amplitude, and
   wherein the control circuit decreases the operating frequency of the switching elements of the power converter in response to a detected current amplitude lower than the predetermined target current amplitude.

3. The discharge lamp ballast of claim 2, the control operations further comprising one or more frequency decreasing operations during an intermediate period between termination of the startup operation and initiation of the electrode heating operation.

4. The discharge lamp ballast of claim 3, wherein the frequency decreasing operations comprise at least a first frequency decreasing operation stepping from a frequency upon termination of the startup operation to a predetermined frequency, and a second frequency decreasing operation stepping to a frequency at the beginning of the electrode heating operation.

5. The discharge lamp ballast of claim 3, wherein a single frequency decreasing operation during the intermediate period comprises a continuous decrease from a first frequency upon termination of the startup period to a second frequency at the beginning of the electrode heating operation.

6. The discharge lamp ballast of claim 3, wherein a duration of the intermediate period is shorter than a duration of the electrode heating operation.

7. The discharge lamp ballast of claim 3, wherein the control circuit is programmed to terminate the starting operation upon detecting ignition of the discharge lamp.

8. The discharge lamp ballast of claim 3, wherein the control circuit is programmed to terminate the starting operation after elapsing of a predetermined time from the beginning of the starting operation.

9. The discharge lamp ballast of claim 1, wherein the control circuit continuously sweeps the operating frequency from an upper limit to a lower limit through a predetermined range during the startup operation.

10. The discharge lamp ballast of claim 9, wherein the predetermined range includes a frequency that is approximately one-third of a low-load resonant frequency.

11. A method of providing feedback current control in a discharge lamp ballast during an operation to heat electrodes in a discharge lamp, the ballast including a DC-AC power converter having a plurality of switching elements, a lamp current sensor and a control circuit, the method comprising:
    repeatedly controlling an operating frequency for the switching elements to sweep from an upper limit to a lower limit through a predetermined range of frequencies in a startup operation to ignite a discharge lamp;
    upon completion of the startup operation, decreasing the operating frequency to a predetermined frequency during an intermediate operation;
    upon completion of the intermediate operation, initiating an electrode heating operation during which a detected lamp current amplitude from the lamp current sensor is compared to a predetermined target current amplitude;
    adjusting the operating frequency during the electrode heating operation based on a comparison of the predetermined target current amplitude and the detected lamp current amplitude from the lamp current sensor; and
    upon completion of the electrode heating operation, decreasing the operating current during a normal operation to maintain stable light output from the lamp.

12. The method of claim 11, wherein the step of adjusting the operating frequency based on a predetermined target current amplitude and a detected lamp current amplitude from the lamp current sensor further comprises
    increasing the operating frequency of the switching elements of the power converter in response to a detected lamp current amplitude greater than the predetermined target current amplitude and
    decreasing the operating frequency of the switching elements of the power converter in response to a detected current amplitude lower than the predetermined target current amplitude.

13. The method of claim 12, wherein the step of decreasing the operating frequency to a predetermined frequency during an intermediate operation further comprises
    decreasing the operating frequency upon completion of the startup operation to a first predetermined frequency during an intermediate operation and further decreasing the first predetermined frequency to a second predetermined frequency during the intermediate operation.

14. The method of claim 12, further comprising the step of terminating the starting operation upon detecting ignition of the discharge lamp.

15. The method of claim 12, further comprising the step of terminating the starting operation after elapsing of a predetermined time from the beginning of the starting operation.

16. An illumination fixture comprising:
a ballast housing configured to house a discharge lamp ballast; and
a lamp housing configured to house a discharge lamp, the lamp housing mechanically coupled to the ballast housing and the discharge lamp ballast electrically coupled to the discharge lamp,
wherein the lamp ballast further comprises
a DC-AC power converter having a plurality of switching elements,
a startup circuit effective to generate a high voltage and ignite the discharge lamp,
a lamp current sensor, and
a control circuit effective to control the switching elements of the power converter in accordance with each of a plurality of control operations, the control operations comprising
a startup operation to ignite the discharge lamp using the high voltage generated by the startup circuit, and
an electrode heating operation after the startup operation during which an amplitude of the current detected by the lamp current sensor is compared by the control circuit to a predetermined target current amplitude, further wherein an operating frequency of the switching elements is controlled in a feedback manner during the electrode heating operation so as to set the amplitude of the current detected by the lamp current sensor to the predetermined target current amplitude.

17. The illumination fixture of claim 16, wherein the control circuit increases the operating frequency of the switching elements of the power converter in response to a detected current amplitude greater than the predetermined target current amplitude, and
wherein the control circuit decreases the operating frequency of the switching elements of the power converter in response to a detected current amplitude lower than the predetermined target current amplitude.

18. The illumination fixture of claim 17, the control operations further comprising one or more frequency decreasing operations during an intermediate period between termination of the startup operation and initiation of the electrode heating operation.

19. The illumination fixture of claim 18, wherein the frequency decreasing operations comprise at least a first frequency decreasing operation stepping from a frequency upon termination of the startup operation to a predetermined frequency, and a second frequency decreasing operation stepping to a frequency at the beginning of the electrode heating operation.

20. The illumination fixture of claim 16, wherein the lamp housing is pivotally coupled to the ballast housing.

* * * * *